United States Patent Office

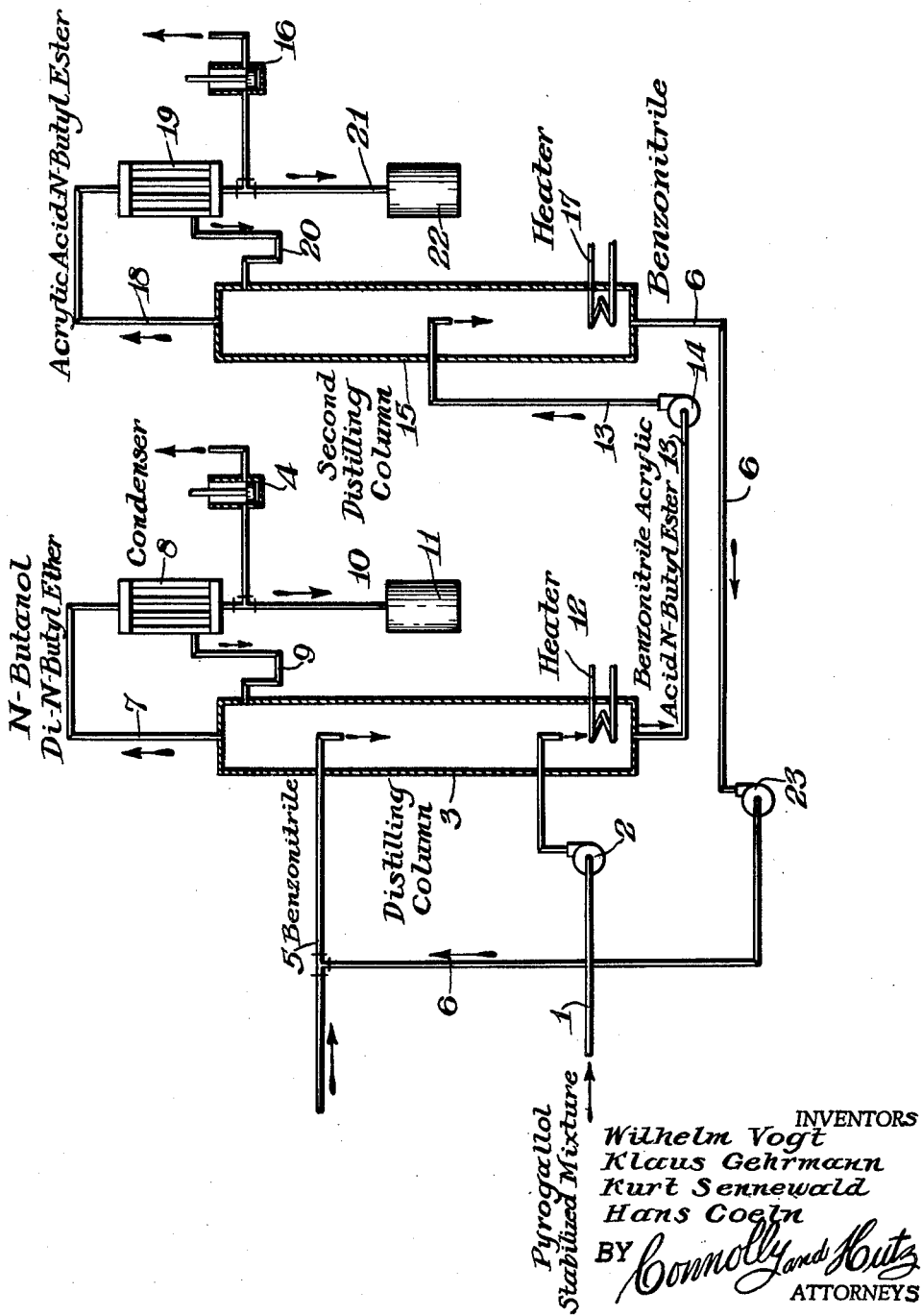

3,190,813
PROCESS FOR SEPARATING ACRYLIC ACID N-BUTYL ESTER FROM MIXTURES CONTAINING BUTANOL

Wilhelm Vogt, Klaus Gehrmann, and Kurt Sennewald, Knapsack, near Cologne, and Hans Cöln, Hurth, near Cologne, Germany, assignors to Knapsack-Griesheim Aktiengesellschaft, Knapsack, near Cologne, Germany, a corporation of Germany
Filed Nov. 23, 1962, Ser. No. 239,515
Claims priority, application Germany, Dec. 16, 1961, K 45,456
11 Claims. (Cl. 202—39.5)

The present invention is concerned with a process for separating acrylic acid n-butyl ester from a mixture with n-butanol which may also contain, as additional components, di-n-butyl ether and/or acetic acid n-butyl ester by extractive distillation while using an appropriate distillation auxiliary.

It is known that acrylic acid n-butyl ester can be separated from n-butanol by simple distillation at atmospheric pressure which, however, involves losses of acrylic acid n-butyl ester due to the polymerization of the ester appearing in concentrated form in the still of the distillation column. The polymerization of the ester is in particular the result of the relatively high distillation temperatures. The mixture of acrylic acid n-butyl ester and n-butanol is impossible to separate by distillation under reduced pressure and at temperatures at which the polymerization of the ester is substantially suppressed for the reason that the acrylic acid n-butyl ester forms, with the n-butanol, a constantly boiling mixture at a pressure of less than 300 mm. mercury.

German Patent 852,851 describes a process for separating azeotropic mixtures of acrylic acid esters with alcohols, wherein the azeotrope is admixed with a distillation auxiliary, for example hexane, which, together with the alcohol, forms a low-boiling binary mixture, and the latter is separated from the ester by distillation. This process suffers from the disadvantage that uneconomical amounts of distillation auxiliary must be used and from the further disadvantage that the ester must be further distilled in order to remove further contaminants optionally present and to obtain the pure product.

In another known process, mixtures of acrylic acid esters with alcohols corresponding to the alcoholic component of the ester are separated by extractive distillation with water, the economic application of this process being, however, limited to those mixtures which contain a readily water-soluble alcohol. If, contrary thereto, the mixture to be separated contains an alcohol which is not readily soluble in water, it should be separated by distillation while using an organic distillation auxiliary, for example acetophenone, tetrahydronaphthalene or oxalic acid diethyl ester (cf. German Patent 1,066,584). The mixture used as the starting material is first separated (a) into a mixture consisting of the ester and the distillation auxiliary and boiling at a temperature higher than the alcohol and (b) into alcohol and possible contaminants, the ester being then separated from the distillation auxiliary by simple distillation.

U.S. patent application Serial No. 220,569 describes a further process for separating a mixture consisting of acrylic acid n-butyl ester and n-butanol and of di-n-butyl ether and/or acetic acid n-butyl ester as additional components by extractive distillation, wherein the mixture to be extracted is admixed with a certain proportion of acetophenone as the distilling auxiliary. In this process, the acrylic acid n-butyl ester is obtained together with the acetophenone as the distillation residue, while the remaining constituents are removed from the distillation receiver. The acrylic acid n-butyl ester is then isolated from the acetophenone by simple distillation. The economy of this latter process and of that described in German Patent 1,066,584 depends essentially on the amount of distillation auxiliary required which, in turn, is a function of the nature of the distillation auxiliary.

The present invention provides two further novel distillation auxiliaries suitable for use in the separation of acrylic acid n-butyl ester of high purity by extractive distillation from a mixture with n-butanol, which may also contain di-n-butyl ether and/or acetic acid n-butyl ester as additional components, the individual constituents of the mixture being present in any desired ratio. The benzonitrile and nitrobenzene are superior in this particular field of application to the customary distillation auxiliaries, the property of the benzonitrile of selectively dissolving acrylic acid n-butyl ester being a little more pronounced than that of the nitrobenzene, the two extracting agents displaying an effect about 10 to 20% more favorable than, for example, the customary acetophenone known to be suitable for use as a distillation auxiliary. In other words, acrylic n-butyl ester can be separated from the above mixtures by extractive distillation in the presence of benzonitrile or nitrobenzene, the nitrobenzene or benzonitrile being used in a proportion reduced by about 10 to 20% by weight as compared with the acetophenone.

The advantage offered by the present invention over the customary methods thus resides in the amount of distillation auxiliary economized and, moreover, in the possibility of separating the starting mixture, especially with the use of nitrobenzene as the distillation auxiliary, with an economic additive on an industrial scale.

The process of the present invention is more especially carried out as follows:

In order to separate acrylic acid n-butyl ester from a mixture with n-butanol which may also contain di-n-butyl ether and/or acetic acid n-butyl ester, the mixture to be separated is introduced, for example, into the lower portion of a distilling column operated at a still temperature of about 100 to 190° C., heated therein to boiling in vacuo under a pressure of between about 40 and 400 mm. mercury, preferably 150 mm. mercury, and the vapor ascending in the column is extracted in counter-current manner with liquid benzonitrile or nitrobenzene, which has been preheated to a temperature within the range of about 50 to 110° C., preferably 85° C. The extracting agent is used in about 5 to 10 times, preferably 8 to 9 times, the amount of the starting mixture and the reflux ratio is maintained within the limits of about 1 to 5:1, preferably 2.5:1, so that all the constituents of the starting mixture with the exception of acrylic acid n-butyl ester and benzonitrile or nitrobenzene leave the extracting column as the head products, whilst the acrylic acid n-butyl ester and the distillation auxiliary remain in the sump of the column. The acrylic acid n-butyl ester is then separated from the benzonitrile or nitrobenzene by simple distillation and obtained as the completely pure head product of the column.

Although the acrylic acid n-butyl ester appears in the extracting column in the state of relatively high dilution and is not exposed to high temperatures so that its polymerization is substantially excluded, it is advantageous to stabilize the mixture to be extracted with a customary polymerization inhibitor, for example hydroquinone, pyrogallol or phenothiazine. In analogous manner, it is advantageous to stabilize the ester during its separation by distillation from the nitrobenzene or benzonitrile.

The following examples serve to illustrate the invention, but they are not intended to limit it thereto, the parts and percentages being by weight unless otherwise stated.

Example 1

100 parts of a pyrogallol-stabilized mixture composed of 25% by weight acrylic acid n-butyl ester, 10% by weight di-n-butyl ether and 65% by weight n-butanol were introduced per hour through line 1 and with the help of pump 2 into the lower quarter of a distilling column 3 provided with 40 bubble trays. By means of heater 12 the whole was heated at a temperature of 142° C. under a pressure of 150 mm. mercury adjusted by means of vacuum pump 4. The vapor ascending in the column 3 was washed in counter-current manner with liquid benzonitrile preheated at 85° C., the benzonitrile being introduced into the upper quarter of distillation column 3 through lines 5 and 6 in a proportion of 500 parts by weight per hour. During the distillation column 3 was maintained at a reflux ratio of 2.5:1. The vapor mixture consisting of n-butanol and di-n-butyl ether leaving column 3 through line 7 at a temperature of 79° C. was condensed in condenser 8, a portion of the resulting condensed matter being refluxed through line 9 into column 3, while the bulk of the condensed matter was conveyed through line 10 to container 11. A mixture of 500 parts by weight benzonitrile and 25 parts by weight acrylic acid n-butyl ester was removed per hour from the still portion in distillation column 3 through line 13 with the help of pump 14, introduced into the middle portion of a second distilling column 15, in which a pressure of 70 mm. mercury was maintained with the aid of pump 16 and separated therein by distillation. Column 15 was provided with heater 17 to heat the mixture. The vapors of pure acrylic acid n-butyl ester escaping through line 18 were liquefied in condenser 19, a portion of the resulting condensate being refluxed through line 20 into the upper portion of column 15. The bulk of the ester was removed through line 21 and collected in container 22. The benzonitrile obtained as the distillation residue in the sump portion of column 15 was withdrawn through line 6 and returned by pump 23 through line 5 into column 3. The yield of recovered acrylic acid n-butyl ester having a purity of 99.9–100% was 24.8 to 25 parts by weight or 99.2 to 100%, calculated on the amount of acrylic acid n-butyl ester initially present in the feed.

*Example 2*

In a manner analogous to that described in Example 1, 100 parts of a hydroquinone-stabilized mixture consisting of 25% acrylic acid n-butyl ester and 75% n-butanol were distilled per hour and thereby separated in the presence of 550 parts benzonitrile under a pressure of 40 mm. mercury and at a temperature of 97° C. in the still of the distilling column. During the distillation, a reflux ratio of 4:1 was maintained in the column. Pure n-butanol was removed at the head of the column at a temperature of 52° C., while a mixture of 25.0 parts acrylic acid n-butyl ester and 550 parts benzonitrile was removed per hour from the still of the distilling column. This mixture was distilled in vacuo under 10 mm. mercury and 24.9 parts acrylic acid n-butyl ester of 99.7 to 99.9% purity were obtained, corresponding to a yield of 99.4 to 99.6%, calculated on the amount of ester contained in the starting mixture.

*Example 3*

In a manner analogous to that described in Example 1, 100 parts of a phenothiazine-stabilized mixture consisting of 25 parts of acrylic acid n-butyl ester, 48 parts n-butanol, 7 parts acetic acid n-butyl ester and 20 parts di-n-butyl ether were distilled per hour and thereby separated in the presence of 900 parts benzonitrile under a pressure of 400 mm. mercury and at a temperature of 165° C. in the still of the distilling column. During the distillation, a reflux ratio of 1:1 was maintained in the column. The vapor mixture leaving the distilling column at a head temperature of 101° C. consisted of n-butanol, acetic acid n-butyl ester and di-n-butyl ether, while a mixture of 900 parts benzonitrile and 25 parts acrylic acid n-butyl ester was removed, per hour, from the still of the distilling column, the latter mixture being separated by distillation in a second distilling column in vacuo under about 300 mm. mercury. The pure acrylic acid n-butyl ester obtained as the distillate was recovered in a yield of more than 99%, calculated on the amount of acrylic acid n-butyl ester contained in the starting mixture.

In a comparative test in which the benzonitrile as the distillation auxiliary was replaced by the customary acetophenone, the acetophenone had to be used in a proportion of 1200 parts.

*Example 4*

In a manner analogous to that described in Example 1, 100 parts of a phenothiazine-stabilized mixture consisting of 25 parts acrylic acid n-butyl ester, 55 parts n-butanol, 5 parts acetic acid n-butyl ester and 15 parts di-n-butyl ether were distilled, per hour, and thereby separated in the presence of 900 parts nitrobenzene under a pressure of 100 mm. mercury and at a temperature of 138° C. in the still of the distilling column. During the distillation, a reflux ratio of 3:1 was maintained in the column. The vapor mixture leaving the distilling column at a head temperature of 70° C. consisted of n-butanol, acetic acid n-butyl ester and di-n-butyl ether, while a mixture of 900 parts nitrobenzene and 25 parts acrylic acid n-butyl ester was removed, per hour, from the still of the column and separated by distillation in a second distilling column in vacuo under 40 mm. mercury. Pure acrylic acid n-butyl ester was obtained as the distillate in a yield of more than 99%, calculated on the amount of ester contained in the starting mixture.

In a comparative test in which the nitrobenzene as the distillation auxiliary was replaced by acetophenone, the acetophenone had to be used in a proportion of 1000 parts to produce acrylic acid n-butyl ester of more than 99% purity.

*Example 5*

In a manner analogous to that described in Example 1, 100 parts of a hydroquinone-stabilized mixture consisting of 50 parts acrylic acid n-butyl ester, 30 parts n-butanol, 10 parts acetic acid n-butyl ester and 10 parts di-n-butyl ether were distilled, per hour, and thereby separated in the presence of 1000 parts nitrobenzene under a pressure of 400 mm. mercury and at a temperature of 183° C., in the still of the distilling column. During the distillation, a reflux ratio of 2:1 was maintained in the column. A mixture consisting of n-butanol, acetic acid n-butyl ester and di-n-butyl ether was removed at the head of the column at a temperature of 100° C., while a mixture of 1000 parts of nitrobenzene and 50 parts acrylic acid n-butyl ester was removed, per hour, from the still of the distilling column. This latter mixture was distilled in vacuo under 100 mm. mercury and acrylic acid n-butyl ester of 99.4% purity was obtained in a yield of more than 99%, calculated on the amount of ester contained in the starting mixture.

We claim:

1. A process for separating acrylic acid n-butyl ester from a mixture containing acrylic acid n-butyl ester and n-butanol by extractive distillation, which comprises adding to the mixture to be extracted a member selected from the group consisting of nitrobenzene and benzonitrile as a distillation auxiliary, distilling off n-butanol as head product of the resultant mixture, and separating the resulting residue which consists of the distillation auxiliary and acrylic acid n-butyl ester by fractional distillation.

2. The process of claim 1, wherein the mixture containing acrylic acid n-butyl ester and n-butanol is extracted in counter-current manner with about 5 to 10 times by weight the amount of a member selected from the group consisting of nitrobenzene and benzonitrile, calculated on the said mixture.

3. The process of claim 2, wherein the mixture is extracted in counter-current manner with about 8 to 9 times by weight of the said member.

4. The process of claim 2, wherein said member prior to extraction has been pre-heated to 50–110° C.

5. The process of claim 1, wherein the mixture to be extracted is stabilized prior to extraction with a polymerization inhibitor selected from the group consisting of hydroquinone, pyrogallol and phenothiazine.

6. The process of claim 1 for separating acrylic acid n-butyl ester from a mixture with n-butanol which also contains as an additional component a member selected from the group consisting of di-n-butyl ether and acetic acid n-butyl ester, the individual constituents of the mixture being present in any desired ratio, by extractive distillation, wherein the additional component is distilled off with the n-butanol as head product.

7. The process of claim 1, wherein the extractive distillation is carried out under reduced pressure under a pressure within the range of about 40 to 400 mm. mercury.

8. The process of claim 7, wherein the extractive distillation is carried out under a pressure of about 150 mm. mercury.

9. The process of claim 1, wherein the member has been pre-heated to about 85° C.

10. The process of claim 1, wherein, during the fractional distillation, a reflux ratio of about 1 to 5:1 is maintained.

11. The process of claim 10, wherein a reflux ratio of 2.5:1 is maintained.

References Cited by the Examiner

UNITED STATES PATENTS

| | | | |
|---|---|---|---|
| 2,406,561 | 8/46 | Rehberg | 260—486 X |
| 2,741,583 | 4/56 | Vaughan et al. | 202—39.5 |
| 3,022,337 | 2/62 | Enk et al. | 260—486 |
| 3,067,241 | 12/62 | Vogt et al. | 260—486 |

FOREIGN PATENTS

| | | |
|---|---|---|
| 1,066,584 | 10/59 | Germany. |
| 1,088,040 | 9/60 | Germany. |

NORMAN YUDKOFF, *Primary Examiner.*